United States Patent
Fritz

(10) Patent No.: US 6,944,281 B1
(45) Date of Patent: Sep. 13, 2005

(54) OUTBOUND CALL CENTER

(75) Inventor: Robert Fritz, Deutsch Wagram (AT)

(73) Assignee: Siemens Aktiengesellschaft, Munich (DE)

( * ) Notice: Subject to any disclaimer, the term of this patent is extended or adjusted under 35 U.S.C. 154(b) by 155 days.

(21) Appl. No.: 10/667,137

(22) Filed: Sep. 22, 2003

(30) Foreign Application Priority Data

Sep. 20, 2002 (EP) .................................. 02021028

(51) Int. Cl.[7] .............................................. H04M 3/00
(52) U.S. Cl. ........................ 379/265.01; 379/265.02; 379/266.07
(58) Field of Search ..................... 379/265.01, 265.02, 379/265.09, 266.07, 266.09, 264, 269

(56) References Cited

U.S. PATENT DOCUMENTS

| | | | | |
|---|---|---|---|---|
| 5,991,395 A | * | 11/1999 | Miloslavsky | 379/265.02 |
| 6,041,116 A | * | 3/2000 | Meyers | 379/244 |
| 6,587,557 B1 | * | 7/2003 | Smith | 379/265.01 |

FOREIGN PATENT DOCUMENTS

| | | |
|---|---|---|
| EP | 0660573 A2 | 12/1994 |
| WO | WO 01/035617 A3 | 5/2001 |

* cited by examiner

*Primary Examiner*—Bing Q. Bui
(74) *Attorney, Agent, or Firm*—Morrison & Foerster LLP

(57) ABSTRACT

A method for operating a communication network in which a call center transmits data to a communication subscriber. The call center has organization units which are arranged with a topological distribution in the communication network and are connected to switching nodes. In the method, an available first organization unit is ascertained, a first communication channel is set up between the first and a second organization unit, the data are transmitted from the second organization unit to the first organization unit, a second communication channel is set up between the first organization unit and the communication subscriber, and the data are transmitted from the first organization unit to the communication subscriber.

12 Claims, 1 Drawing Sheet

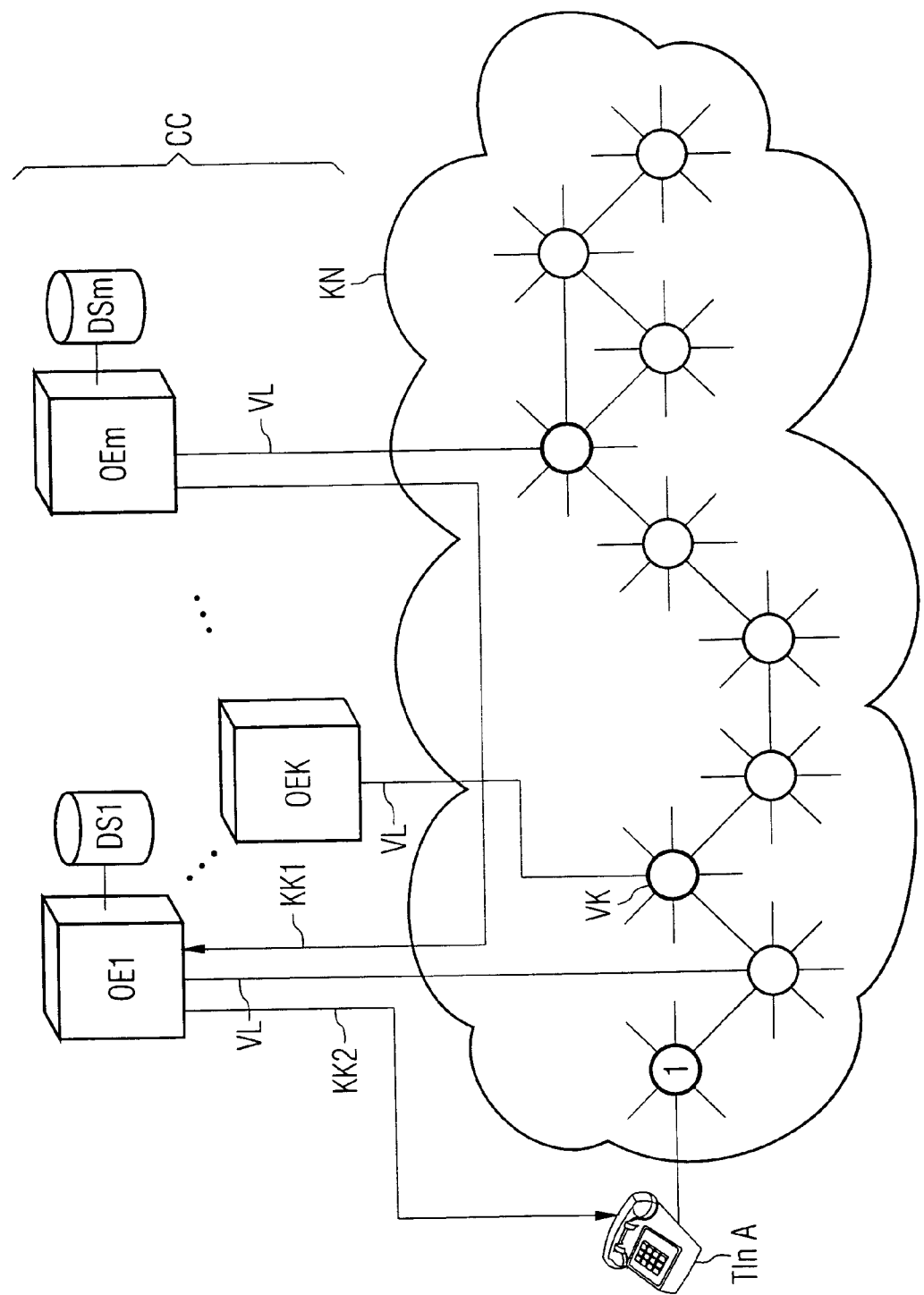

OUTBOUND CALL CENTER

CLAIM FOR PRIORITY

This application claims priority to European Application No. 02021028.2, filed on Sep. 20, 2002, the contents of which are hereby incorporated by reference.

TECHNICAL FIELD OF THE INVENTION

The invention relates to a method for operating a communication network, and in particular, to a call center transmitting data to a communication subscriber, the call center comprising organization units which are arranged with a topological distribution in the communication network and are connected to switching nodes.

BACKGROUND OF THE INVENTION

A call center is a service company which provides operator-assisted voice services. A call center is comparable to a telephone center in which a group of specific employees, "agents", handle telephone inquiries. Typical areas of use are mail-order companies, insurance companies and customer service and also customer hot lines.

In order to increase the utilization level of a call center, "outbound call centers" are known, which are forms of organization in which the agents at the call center do not just handle incoming calls but also actively make outgoing telephone calls at times when there is a low level of traffic. A call center which also deals with outgoing traffic becomes a sales instrument which can actively conduct telephone marketing and can also gain new customers. Redesignating an agent who initially handles only incoming calls as an agent who actively makes outgoing telephone calls can be done automatically by technical equipment at the call center. In addition, an "automatic call distributor" can also combine agents into groups which are temporarily responsible for a particular area. The tasks of these groups can alternate.

At a call center, it is normal for callers to be put into queues at peak times and for the assignment of the call handlers to be changed on the basis of the length of the queue. At a mixed call center, agents handling outbound traffic can be switched to groups with inbound tasks for a short while. This means that the call center can be flexibly adapted to a fluctuating traffic volume.

At a call center, various communication channels converge. Each of the agents has efficient access both to product databases and to customer databases. The services provided by a call center therefore increasingly go beyond voice services and comprise general data transmission.

A call center can be incorporated in different company divisions, such as marketing, market research, consulting, sales/marketing and customer services and also other services.

As the task area grows, the complexity of a call center's organization increases. If the number of employees at a call center was initially frequently below one hundred, call centers with up to more than one thousand agents are known today. These agents are not based at a central office, but rather their workplace is in spatially distributed offices, possibly even in private residences. This means that the call center's organization can also be divided into units which are distributed over a plurality of locations.

Normally, each of these locations is connected by means of subscriber lines to a switching node in a wide area network, for example the integrated services digital communication network ISDN, and the organization units are networked to one another. A wide area network normally extends to a national space and comprises both terrestrial landline networks and mobile radio networks, which means that a large number of communication subscribers can communicate with one another simultaneously. The Internet, as a global network, is increasingly joining up with regional public or formerly public telecommunication networks which were originally designed exclusively for voice transmission. This structure of the communication networks normally incorporates distributed call centers.

If an outbound call center transmits information to the outside, user channels in the communication network are engaged. The physical length of the user channels is prescribed by the local distance between data source and data sink. The scope of the information which is to be transmitted fluctuates depending on the service provided by the call center: information relating to the sale of products is usually more extensive than automatic greeting or reminder information or than a wakeup call. Particularly with short messages, such as greeting and reminder messages, the involvement for setting up the connection and for engaging user channels is comparatively high. Comparatively high transmission costs are incurred. These are transferred according to the role of the party involved, i.e. network operator, service operator, service provider or service customer. The operator of a call center is interested in keeping down the transmission costs incurred for operating the call center as much as possible.

SUMMARY OF THE INVENTION

The invention discloses a method for operating a communication network in which transmitting data from an organization unit of a call center to a communication subscriber is easier and gives rise to fewer costs.

In one embodiment of the invention, there is a two-stage data transmission: in a first stage, the data are transmitted within the call center's organization to a unit of the call center which—from a local point of view—is closest to the service customer. From there, the data are transmitted to the service customer in a second stage. The transmission path thus does not lead directly from the data source to the data sink, but rather via a call-center organization unit which is locally closest to the data transmission's destination. Since the organization units are networked to one another via switching nodes, the opportunity arises to use, besides user channels in the network, also communication channels which are otherwise provided for directing the datastreams. Transport of the data can thus be efficiently handled over long distances by virtue of standardized organization of the network's signaling channels. For short messages, such as greeting and reminder messages and also wakeup calls, this step-by-step handling of data transmission is particularly beneficial. Even with large volumes of data whose transmission can be routed at least temporarily via signaling channels, according to utilization level, the user channels' busy times and consequently the costs incurred are reduced.

In another embodiment of the invention, a first organization unit of the call center is first ascertained which is locally closest to the end customer. This can be a local exchange or a mobile radio gateway. A second organization unit whose memory stores the data sets up a communication channel to this point in the network, and the data are transmitted. When these data have arrived, this first organization unit sets up a second communication channel which connects the first organization unit to the service user. Finally, this second transmission channel is used to transmit the data to this end customer.

In one preferred embodiment, the communication network comprises the integrated services digital communication network ISDN, so that the data can be transmitted between the second organization unit and the first organization unit via the central signaling channel. In the field of terrestrial telecommunication networks, ISDN is a widely used standard and allows simultaneous transmission of voice and data. The latter is particularly advantageous for current and future operational forms of call center. In an ISDN network, user paths and signaling paths are separated—both logically and physically: the lines for user data transmission run separately from the lines which transmit signaling information. This separation gives rise to a dedicated signaling network, an "overlay network" which exists at least temporarily in addition to the user channel network, depending on mode of operation. The overlay network's signaling channel can be used for data transport from the call center to the subscriber. On account of the largely standardized transmission procedures in this transmission path, this is particularly beneficial in terms of the transmission costs.

It is advantageous in this context if the data are transmitted by the signaling system Common Channel Signaling No 7. In the ISDN, the ITU-T signaling system No 7 (Common Channel Signaling System No 7 (CCSS No 7)), SSNO 7 for short, is largely standardized. In the signaling network, it ensures that the 64-kbit/s user channel connections are set up and cleared down between the digital exchanges and is also used for controlling ISDN services. This considerably simplifies ascertainment of a call center location's organization unit which is locally closest to the communication subscriber: the identification number (this is part of the signaling system Common Channel Signaling No 7) has already been used for clearly determining every digital exchange in the SSNO 7 network). Hence, the information for selecting an optimum transmission path in the ISDN network is already available.

Since a calling subscriber's subscriber number can be transmitted in the ISDN network, it can also be beneficial if this subscriber number is used for ascertaining the locally closest available call center organization unit. In this case too, the information for optimum path selection is already available internally in the network.

Preferably, setting up a communication channel between the second organization unit and the first organization unit involves proceeding such that a request to engage a call center agent is made to the first organization unit. If the request is accepted, then an agent is available. If no agent is available on account of overloading in the addressed unit, an organization unit which is closest to this addressed organization unit can be ascertained and can be added to the transmission path. An optimum route can thus also be achieved in times of heavy traffic. A routing table which lists the availability of individual organization units of the call center makes it easier to find an available organization unit which is topologically beneficial at the same time.

In terms of data security, it is advantageous if the request to engage an agent involves transmitting a transaction action number. This transaction number can ensure that only an authorized agent is provided with access authorization to a communication subscriber's data.

It is also advantageous if the data can be stored in the "signaling end points", which are those switching nodes at which connections start or end. This decouples transmission of the data in the network and makes it a simple matter to implement step-by-step execution of the data transmission.

BRIEF DESCRIPTION OF THE DRAWINGS

The present invention becomes easier to understand from the detailed description below and from the schematic illustration of the single appended drawing, in which:

FIG. 1 illustrates a network structure of a communication network in accordance with the invention.

DETAILED DESCRIPTION OF THE INVENTION

FIG. 1 illustrates the network structure of a communication network in a preferred embodiment of the invention. A call center CC is divided into various organization units OE1, . . . ,OEk, . . . ,OEm. These are respectively connected by means of connecting lines VL to switching nodes VK in the integrated services digital network ISDN, denoted by the reference KN in the drawing. From a spatial point of view, the individual organization units OE1, . . . ,OEk, . . . ,OEm are distributed in the communication network KN on a regional basis. The section network shown connects the exchanges or switching nodes shown as circles. In the illustration in the drawing, switching nodes with a connected call center unit have a gray background. The type of the connections between the organization units OE1, . . . ,OEk, . . . ,OEm is set up by signaling channels and/or via data lines.

FIG. 1 shows a first organization unit OE1 which is locally closest to the subscriber TlnA. It is connected to an ISDN switching node VK. In the case of outbound operation of the call center CC, data transmission is now intended to be set up to the subscriber TlnA as easily and inexpensively as possible. This is conventionally done by setting up a connection between the data source, a call-center organization unit which contains the data which are to be transmitted, and the data sink, the end customer. The transmission conventionally occurred on user channels. In the invention, in which the communication network is operated, takes into account the infrastructure of the ISDN network. In this case, the path which engages the fewest possible resources is automatically chosen. When a connection is set up to an end customer TlnA from the call center CC, the transmission path does not run via user channels over long distances, but rather includes the central signaling channel in the ISDN network. First, the calling call center organization unit needs to receive information about which of the units OE1, . . . ,OEk, . . . , OEm distributed throughout the network is as close as possible to subscriber TlnA. The call center obtains this topological information from the ISDN network, since the exchanges have already been clearly identified by identification numbers. As soon as this location denoted as the first organization unit OE1 has been ascertained, the second organization unit OEm sets up a first communication channel KK1 to OE1; OE1 is as close as possible to the subscriber TlnA. Subsequently, the second organization unit OEm sends a request to engage an agent to the organization unit OE1. If an agent is available to handle the request in OE1, then he receives the request and, for his part, requests transmission of the subscriber data from OEm. A transaction number transmitted to the agent in the request is used to ensure that the agent is authorized to retrieve the data. OEm transmits the data from the data store DSm to the data store DS1 in the first call center unit OE1. When these customer data have arrived at OE1, the agent in the unit OE1 sets up a second communication channel KK2 to the service user, the end customer TlnA. Finally, the data are transmitted via this second transmission channel KK2 to the subscriber TlnA. If no agent is available at the location OE1 on account of overloading, provision is made for the request to be put in a queue. If no agent is available within a prescribable time interval, there is a switch to a third organization unit OEk, which is as close as possible to TlnA and has an available agent.

In the invention, operation of the communication network makes it possible for a network operator to make better use of network-internal communication paths and to pass on this advantage to one of the parties involved in providing the service, for example to a call center operator. The better utilization of the network infrastructure allows call center services to reach the end customer less expensively.

What is claimed is:

1. A method for operating a communication network in which a call center transmits data to a communication subscriber, the call center including organization units which are arranged with a topological distribution in the communication network and are connected to switching nodes, comprising:
   determining an available first organization unit which is locally closest to the communication subscriber;
   setting up a first communication channel between the first and a second organization unit which includes the data to be transmitted in a memory;
   transmitting the data from the second organization unit to the first organization unit;
   setting up a second communication channel between the first organization unit and the communication subscriber; and
   transmitting the data from the first organization unit to the communication subscriber.

2. The method as claimed in claim 1, wherein the communication network comprises the integrated services digital communication network ISDN, and the data are transmitted between the second organization unit and the first organization unit via the central signaling channel.

3. The method as claimed in claim 2, wherein the signaling system Common Channel Signaling No 7 is used in the signaling channel.

4. The method as claimed in claim 3, wherein ascertaining the first organization unit involves the use of the identification number of the signaling system Common Channel Signaling No 7.

5. The method as claimed in claim 4, wherein ascertaining the first organization unit involves the use of a routing table which includes entries about the availability of the organization units.

6. The method as claimed in claim 3, wherein ascertaining the first organization unit involves the use of the subscriber number of the communication subscriber.

7. The method as claimed in claim 6, wherein ascertaining the first organization unit involves the use of a routing table which includes entries about the availability of the organization units.

8. The method as claimed in claim 1, wherein setup of the connection between the second organization unit and the first organization unit is followed by the second organization unit transmitting a request to engage a call center agent in the first organization unit.

9. The method as claimed in claim 8, wherein the transmission of the request comprises a transaction number which authorizes an agent in an organization unit to access data associated with a subscriber.

10. The method as claimed in claim 8, wherein if an agent is not available in the first organization unit the request is put into a queuing loop and, when a prescribable time interval has elapsed, is forwarded to an available organization unit which is closest to the first organization unit.

11. The method as claimed in claim 1, wherein the data in the first organization unit are buffer-stored in a memory.

12. Te method as claimed in claim 1, wherein the call center interacts with a communication network.

* * * * *